United States Patent [19]

Weisser

[11] Patent Number: 4,470,644
[45] Date of Patent: Sep. 11, 1984

[54] MAGNETIC SUSPENSION DEVICE FOR INERTIAL WHEEL

[75] Inventor: Bernard Weisser, Verneuil sur Seine, France

[73] Assignee: Societe Nationale Industrielle Aerospatiale, Paris, France

[21] Appl. No.: 478,009

[22] Filed: Mar. 23, 1983

[30] Foreign Application Priority Data

Mar. 26, 1982 [FR] France ................... 82 05190

[51] Int. Cl.³ ............................................. F16C 39/00
[52] U.S. Cl. ..................................................... 308/10
[58] Field of Search ............... 308/10; 74/5.47, 5.5, 74/5.7; 244/164–166

[56] References Cited

U.S. PATENT DOCUMENTS

| | | | |
|---|---|---|---|
| 3,937,533 | 2/1976 | Veillette | 308/10 |
| 3,955,858 | 5/1976 | Poubeau | 308/10 |
| 4,000,929 | 1/1977 | Studer | 308/10 |
| 4,043,614 | 8/1977 | Lyman | 308/10 |
| 4,077,678 | 3/1978 | Studer | 308/10 |
| 4,211,452 | 7/1980 | Poubeau | 308/10 |
| 4,244,629 | 1/1981 | Habermann | 308/10 |
| 4,285,553 | 8/1981 | Robinson | 308/10 |

FOREIGN PATENT DOCUMENTS

| | | | |
|---|---|---|---|
| 2331613 | 1/1975 | Fed. Rep. of Germany | 308/10 |
| 2257815 | 1/1975 | France | 308/10 |

*Primary Examiner*—R. Skudy
*Attorney, Agent, or Firm*—Karl W. Flocks; Sheridan Neimark; A. Fred Starobin

[57] ABSTRACT

A magnetic suspension device for inertial wheel or rotary body holds a rotor coaxially with respect to a stator while being mechanically free. On the stator side it comprises an inner continuous ferromagnetic crown and an outer discrete ferromagnetic crown formed with a plurality of diametrically opposite sectors provided with coils. Between said crowns there is interposed an axially magnetized crown carried on the rotor and clamped between two annular flanges. Said coils provide for radial centering of the rotor whereas the magnetized crown provides for axial centering thereof. The association of the crowns and the sectors ensures minimum path for the induction lines. The magnetic suspension device is intended for space or terrestrial applications especially for satellites, telecommunications, vacuum pumps, printing cylinders, machine-tools, optical scanning systems and the like.

9 Claims, 8 Drawing Figures

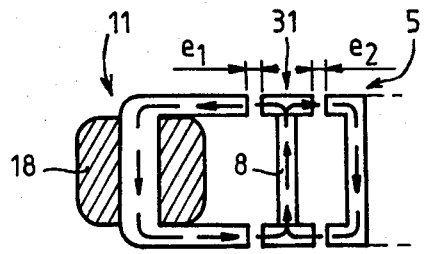
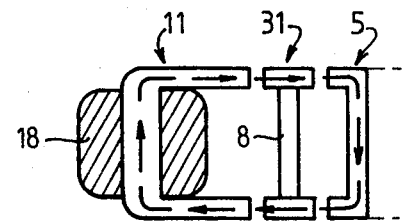
FIG. 4  FIG. 5
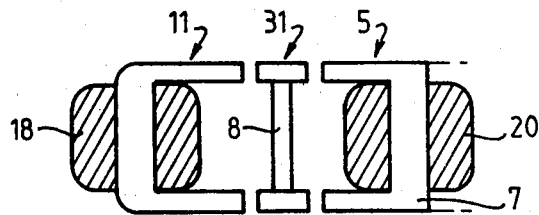
FIG. 6
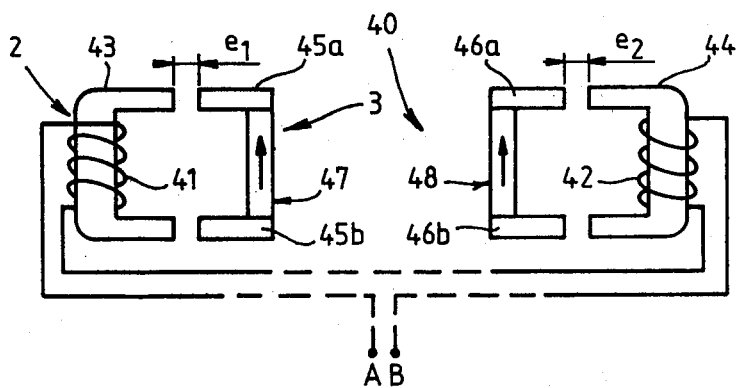
FIG. 7
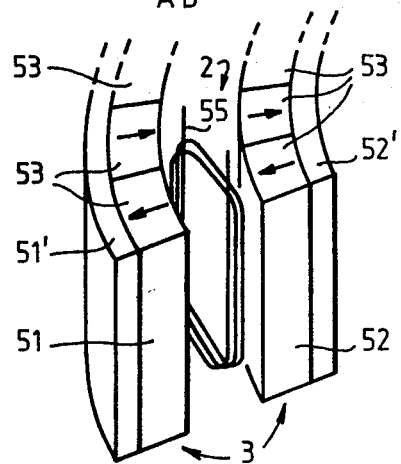
FIG. 8

MAGNETIC SUSPENSION DEVICE FOR INERTIAL WHEEL

This invention relates to a magnetic suspension for inertial wheel to provide for the centering thereof through at least two radial servo-control means. Such suspension finds application in all space or terrestrial domains implying reaction wheels or kinetic wheels such as applications to satellites, telecommunication systems, vacuum pumps, printing cylinders, machine-tools, or else, optical scanning systems. Generally, the invention can be applied to any rotary body rotatable with respect to a stationary body.

Inertial devices substantially comprise a stator having a rotor rotating at a high speed relative thereto, said rotor being supported and maintained coaxially with respect to said stator through bearing means. The major difficulty encountered in designing such devices is the required reliability of the bearings since they have to work for long periods.

The development of magnetic bearings has permitted to prevent frictions, and therefore, to reduce the wear of the bearings, as well as to minimize any associated energy losses to a much lower level than would be permitted with the most sophisticated mechanical roll bearings. Among mechanical bearings, two categories of centering means are to be considered according to whether they are passive, i.e. consisting of permanent magnets, or active, when they comprise electric coils cooperating with ferromagnetic parts. The latter are called actuators.

The most recent developments show a tendency to devise increasingly simpler, thus more reliable, actuators while reducing to minimum the stator mass to the advantage of the rotor inertial moment so as to obtain about the rotational axis the highest possible inertial moment for a given total mass (rotor+stator).

Therefore, many inertial devices have been proposed, using for example radial centering passive means and axial centering active means. Thus, U.S. Pat. No. 3,955,858 (POUBEAU) describes a very complete assembly of centering, damping and driving magnetic means, with the control of the axial centering actuator being provided by a speed sensor. U.S. Pat. No. 4,211,452 also to POUBEAU describes an inertial device having improved magnetic means corresponding to a simplified structure permitting higher reliability. Reference is made succinctly therein to an axial centering actuator substantially located at the same distance from both ends of the rotational axis of the rotor with respect to the stator; it comprises a radial magnetization annular magnet carried on the rotor and the magnetic field of which is closed towards the ends of said axis through ferromagnetic crowns carried on the stator, accommodated within electric concentric coils. The operation of the latter is also controlled by an axial speed sensor. In such devices several magnetic means are necessary to provide the various centerings.

Moreover, U.S. Pat. No. 4,077,678 describes an energy storage device with inertial wheel having a suspension of the magnetic type containing a combination of axial centering passive means and radial centering active means. However, such means are all carried on the stator and their mass does not contribute to the kinetic moment of the rotor, which is disadvantageous, especially in the domain of space activities wherein the utilization of the total mass of the device is to be optimized. On the other hand, U.S. Pat. No. 4,043,614 describes a device wherein the stator comprises a thick disk perpendicular to the rotational axis, axially magnetized and clamped between two polar disks of slightly higher diameter so as to accommodate on the periphery thereof two pairs of diametrically opposite electric coils. The rotor is located about the stator; it comprises a crown axially magnetized in the reversed direction with respect to the disk and clamped between two flat polar rings located in the balanced position opposite said polar disk. The main disadvantage of such device is bound to the absence of any magnetic flux permeable path between the polar parts carrying the coils thereby substantially limiting the efficiency of the actuator. Such difficulties are surmounted in U.S. Pat. No. 4,285,553 which proposes a device in which the stator no longer comprises any magnetized part, with the polar disks being replaced by inner flat polar rings connected through a cylindric ferromagnetic partition. The electric coils are disposed preferably on said cylindric partition; this permits to avoid the formation of slots in the inner polar rings to secure the coils, which leads to the generation of eddy currents.

According to such device the induction lines produced by a pair of diametrically opposite coils, simultaneously fed, circulate in the polar rings of the rotor on a half-perimeter and are closed through the cylindric partition of the stator in two diametrically opposite zones facing said coils. Therefore, such induction lines only meet a reluctance corresponding to four times the gap between polar parts without encountering the reluctance of the rotor magnetized crown.

Practically, in such device induction losses are not negligible. On the one hand, certain induction lines close up after only a quarter of perimeter in crossing the gaps at the complementary pairs of coils, thereby resulting in spurious interactions between both corresponding radial servo-controls. On the other hand, certain induction lines close up substantially tangentially of the supplied rotor crown thereby producing losses which are the more significant the longer the path of the induction lines along the polar rings.

The object of this invention is to reduce such losses and to this end, proposes a magnetic suspension device for inertial wheel or rotary body wherein a stator and a rotor are maintained coaxially along a common axis although they are mechanically free with respect to one another, and of the type comprising at least one magnetic bearing, wherein the latter comprises, carried on the stator along differing coaxial axes, at least two pairs of identical ferromagnetic sectors diametrically opposite with respect to the common axis, said sectors comprising discrete lower and upper annular polar parts integrally made with cylindric bottom portions, one at least of the sectors in each pair being provided with a coil, said sectors being adapted to cooperate with an axially magnetized crown carried on the rotor and clamped between two lower and upper ferromagnetic annular flanges as well as with a continuous U-shaped ferromagnetic crown carried on the stator on the other side from said sectors with respect to said magnetized crown, and comprising lower and upper polar rings integrally made with a cylindric bottom, the polar parts and rings of the sectors and of the ferromagnetic crown being adapted to close on themselves the induction lines emitted by the magnetized crown on either part of said crown.

In such a device which substantially meets only the reluctance of four gaps, the induction lines have a very short path disposed in a plane containing the rotational axis. The small length of such path remedies one of the mentioned types of losses. Furthermore, no spurious interaction is to be apprehended between the sector pairs associated with different axes. Such minimized losses permit to improve the efficiency of the coils and to reduce power comsumption thereof.

In the device according to this invention there can be found again some of the characteristics already described in certain of the mentioned patents. Thus, one also uses the principle of selective implementation of several pairs of coils coupled according to two perpendicular axes for radial centering of a rotor, whereas the axial centering thereof is obtained by passive means only carried on the rotor; this principle appears in U.S. Pat. No. 4,285,553. Moreover, the above-mentioned U.S. Pat. No. 4,211,452 already discloses the idea of inserting a magnetized crown carried on the rotor between two ferromagnetic circuits provided with coils each adapted to close up the induction lines and carried on the stator. In such device however, there is provided an axial centering which is substantially very different from the radial centering which is the object of this application, since the axial centering is effected in a single direction substantially stationary with respect to the rotor, whereas the radial centering is effected in two directions which are not fixed with respect to the rotor. Consequently, the number of coils is multiplied at least twice, their shape is modified and their implementation is significantly more difficult to control than in the case of the axial centering. Adaptation of the mentioned device with a view to providing radial centering has therefore required complete remodelling and substantial improvement of its operational features. Unexpectedly, this permits to obtain far better performances than in the case of each of the mentioned devices.

Other characteristics and advantages of this invention will appear from the following description of one exemplifying mode of embodiment of a magnetic suspension device according to this invention, with reference to the attached drawings on which:

FIGS. 4 and 5 are schematical views of the induction lines produced in the left hand portion by the magnetized crown and a coil respectively;

FIG. 6 is a cross-sectional view of the left hand portion of an alternative form of embodiment;

FIG. 7 is a cross-sectional view along a diameter of a radial speed sensor;

FIG. 8 is a perspective view of a portion of electromagnetic motor.

Figure 1:
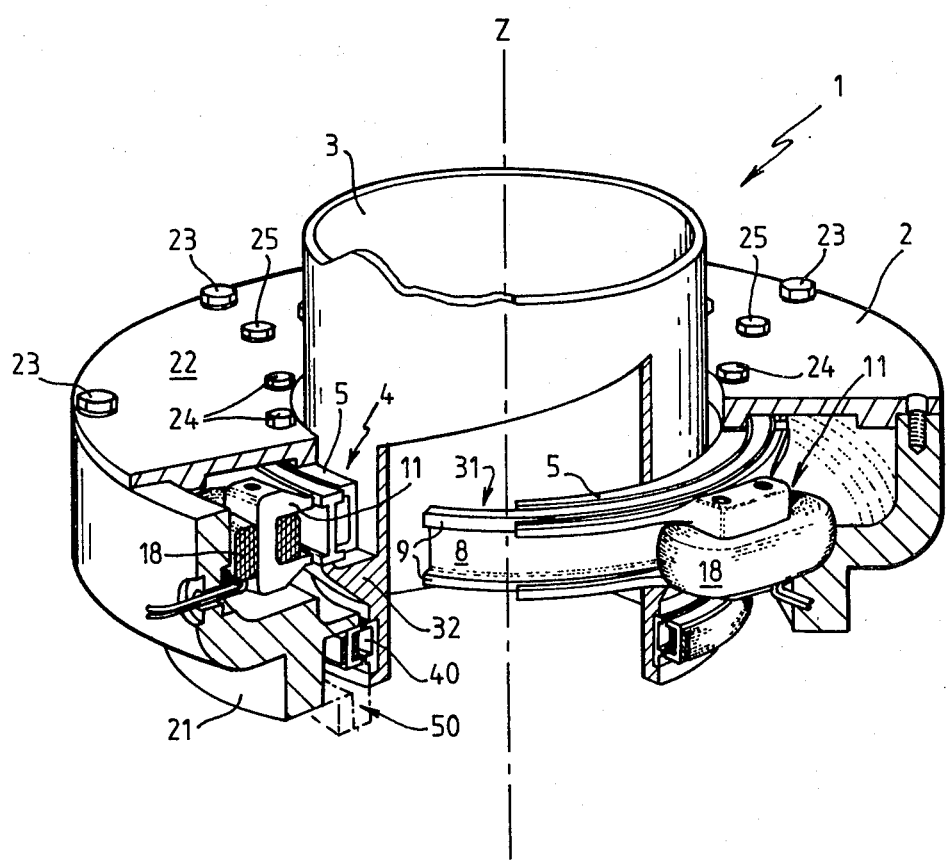
FIG. 1 is a perspective view with parts broken away of a rotor and stator assembly provided with a magnetic suspension device according to the invention.
Figure 2:
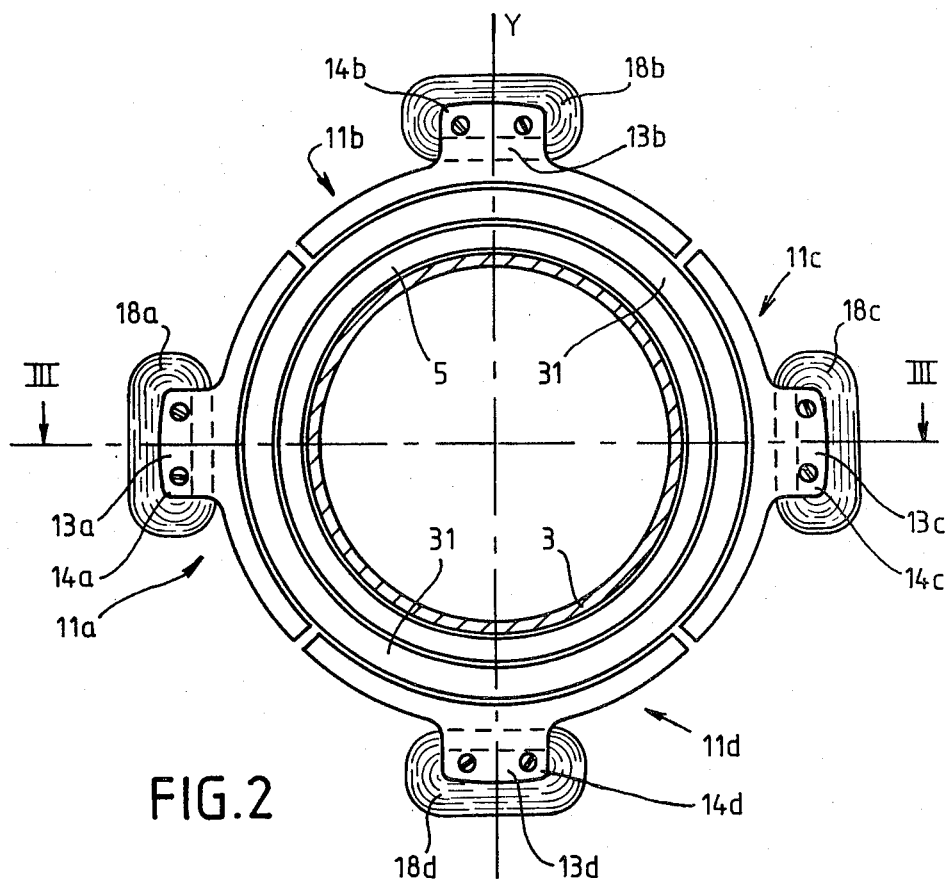
FIG. 2 is a plane view of said device.
Figure 3:
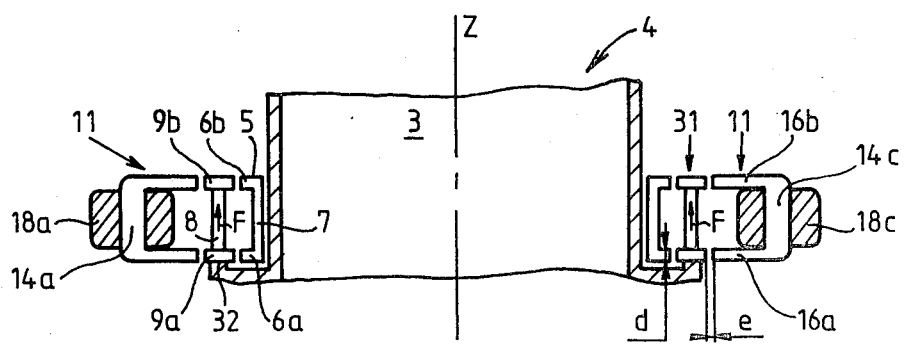
FIG. 3 is a cross-sectional view of said device taken along line III—III of FIG. 2.

With reference to the form of embodiment of a magnetic suspension device according to the invention, as shown in FIGS. 1 through 5, an inertial system 1 comprises a stator 2 of axis Z and a central rotor 3 maintained coaxially and mechanically free relative to said stator by a magnetic bearing designated by 4 as a whole. The stator 2 comprises a housing 21 partly closed by a cover 22 to which it is secured by screws 23. The magnetic bearing 4 comprises on the stator side an inner continuous ferromagnetic U-shaped crown 5 secured to the cover 22 by screws 24, and the concavity of which is radially directed outwardly. Such ferromagnetic crown 5 comprises two planar lateral walls or inner, lower 6a and upper 6b, polar rings, made integrally by their inner edges with the cylindric bottom 7. The magnetic bearing 4 also comprises a crown 31 of an I-shaped cross-section connected to the rotor 3 by a cornice 32; crown 31 comprises a cylindric crown of magnets, or magnetized crown 8, the axial magnetization of which is parallel to axis Z as shown by arrows F. Said magnetized crown 8 is clamped between two annular lower 9a and upper 9b ferromagnetic flanges coaxial with respect to said magnetized crowns, according to axis Z in the normal position of the rotor with respect to the stator. The height of the magnetized crown 8 is preferably equal to that of the cylindric bottom 7 such that the inner polar rings 6 and the flanges 9 are coplanar in the normal position; the width of the gaps between said flanges and said polar rings is then equal to e.

According to this invention, in the exemplifying form of embodiment the magnetic bearing 4 also comprises four ferromagnetic sectors 11a, 11b, 11c and 11d, on the stator, secured to the cover 22 by screws 25 and forming a discrete external ferromagnetic crown coplanar with the internal ferromagnetic crown 5; is has a U-shaped cross-section the concavity of which is radially directed inwardly. These sectors are regularly spaced, diametrically opposite in pairs according to two axes X and Y forming a rectangular trihedron with axis Z. They advantageously present a symmetrical plane containing axis Z. They consist of planar annular lateral walls, or discrete, lower 16a and upper 16b, external polar parts connected by cylindric bottom portions 14a, 14b, 14c, 14d; such outer polar parts 16 advantageously cover larger angular sectors than those covered by said bottom portions 14 so as to provide only for a slight spacing between the outer polar parts of two adjacent magnetic sectors. In the normal balanced position of the rotor with respect to the stator, the outer polar parts define with the flanges 9 a gap of a width e. An electric coil 18a, 18b, 18c or 18d is disposed about each bottom portion 14. The coils disposed on two diametrically opposite ferromagnetic sectors are advantageously coupled in series or parallel coupling so as to be fed simultaneously; they form with the said sectors a radial actuator. The magnetic bearing 4 is therefore constituted by two radial actuators acting according to two perpendicular servo-control axes. The flanges 9, the inner polar rings 6 and the outer polar parts 16 advantageously have one and the same thickness d to prevent any distortion of the induction lines crossing the gaps separating them.

The magnetized crown 8 produces a permanent induction flux which closes up both through the inner ferromagnetic crowns 5 and through the ferromagnetic sectors 11, so that the polar parts of such sectors advantageously form an almost complete outer ferromagnetic crown.

Due to the geometry of the magnetic bearing 4, a shift of the rotor with respect to the stator on a little distance relative to the thickness d provokes, due to the magnetized crown 8, the generation of an axial back force substantially proportional to said axial shift, with a view to returning to maximum value the induction in the gap separating the flanges 9 of the inner 6 and outer 16 polar parts. The magnetic bearing 4 therefore provides in a passive manner, due to the axial stiffness thereof, for the centering of the rotor relative to the stator.

The mentioned normal balanced position corresponding to the equality of the gaps on either parts of the flanges 9 corresponds to an unstable equilibrium. As a matter of fact, the attraction forces exerted upon the magnetized crown 8 by one of the inner polar rings or one of the outer polar parts are increasingly stronger as said crown becomes closer thereto; in this way a shift in a given direction of the axis of the rotor relative to the axis Z of the stator causes the generation of magnetic forces which tend to increase such shift. By radial stiffness of the magnetic bearing it is meant the ratio of a magnetic force, exerted on the rotor responsive to a shift, to the amplitude of said shift.

The return of the rotor towards its unstable balanced position requires the operation of the actuators. The efficiency of each actuator is given by the amplitude of the return force applied thereby to the rotor as a function of the intensity flowing through the coils thereof.

The efficiency of an actuator according to this invention is substantially improved as compared to the already existing actuators due to the little reluctance opposed to the magnetomotive forces produced by the coils.

The specific design of an actuator according to this invention permits moreover to avoid the formation of any slot on the inner ferromagnetic crown 5 that might provoke energy losses by production of eddy currents. However, such slots are necessary in the actuators according to the mentioned patents. It is of course possible to keep them and dispose pairs of inner coils 20 as shown in the U.S. Pat. No. 4,285,553 along the same angular orientations as the coils 18 of the sectors 11. Thus, FIG. 6 shows the cross-section of a magnetic bearing the efficiency of which is still improved in as much as the facing coils 18 and 20 can advantageously be coupled for supplying power.

FIG. 1 shows a magnetic bearing 4 comprising two radial actuators according to the invention. It is designed for compensating for any radial play of the rotor relative to the stator. In certain cases there can advantageously be provided radial actuators in a higher number, regularly distributed from the angular point of view so as to simplify and refine the recentering steps. There can also be provided a suspension system comprising several magnetic bearings to provide for the suspension of a specially massive rotor rotating at a very high speed or largely extended in the direction of its rotational axis. As already mentioned above a radial actuator may comprise only a single coil along its axis.

The control of said coils 18 and possibly 20 is ensured by a servo-control electronic unit using either a position sensor without contact of a known type or a radial speed sensor in the considered direction advantageously realized according to the following description. In this latter case, the control circuitry of said coils becomes substantially simpler as already mentioned in U.S. Pat. No. 4,211,452. FIG. 7 shows an exemplifying form of embodiment of a speed sensor such as that designated by reference 40 in FIG. 1. There are actually as many speed sensors as there are radial actuators. Each radial speed sensor consists of two coupled electric coils 41 and 42 disposed on circumferential U-shaped armatures 43 and 44 carried on the stator and opposed according to a diameter parallel to that of the actuator to be controlled. Such armatures cooperate with polar parts 45a, 45b, 46a, 46b, in a circular arc, fastened to the rotor 3, tightening cylindric portions 47 and 48, the permanent magnetizations of which are directed axially in the same direction. Across terminals A and B of the common circuit of both coils 41 and 42 an electric voltage is produced, proportional to the radial speed according to the reference diameter due to the variations in the flux of said coils induced by the variations in the gaps $e_1$ and $e_2$. This voltage can easily be used for controlling the actuator associated with such radial speed sensor.

In the form of embodiment considered the above described speed sensor can be replaced while keeping the same advantages by any other speed sensor without any position sensor.

The rotor is driven relative to the stator by any conventional known means. This can be for example an electromagnetic motor of the ironless type or galvanometric type such as that schematized by reference 50 in FIG. 1 and illustrated in FIG. 8. Such motor comprises two magnetized crowns 51 and 52 on the rotor, consisting of axial bars 53 of radial magnetization closed through ferromagnetic blocks 51' and 52'. The direction of magnetization is reversed from one bar to the other. The bars opposite to the crowns 51 and 52 have parallel magnetizations of the same direction. Each group of four neighbouring opposite bars therefore produces an induction circuit between the crowns 51 and 52. Between such crowns, coils 55 are disposed, carried on the stator and belonging to a triphased or multiphased winding which is supplied from a DC power source. The current flowing in such coils interferes with the induction produced in the bars 53, thereby causing in a known manner the rotor to move angularly relative to the stator. The direction of the current in each of the phases is determined by a set of switches controlled by rotation sensors.

It is to be noted that the above described forms of embodiment lead to optimum utilization of the mass of the system since all the heavy magnetized parts are carried on the rotor.

The invention was only described in an exemplifying manner. It also includes radial actuators formed by an outer continuous ferromagnetic crown and inner ferromagnetic sectors.

It will be understood that this invention was only described and represented in a preferential exemplifying manner and that equivalent parts can be substituted for its constituents without however departing from its scope as defined in the appended claims.

I claim:

1. A device for magnetic suspension of a rotor in respect to a stator, said rotor being mechanically free with respect to the stator and being rotatably driven with respect to said stator about a rotational axis by means of a motor, said device comprising:

two pairs of identical ferromagnetic sectors diametrically opposite with respect to said axis, and provided on the stator according to different radial axes; said sectors comprising lower and upper discrete polar parts integrally made with cylindric bottom portions;

electric coil means about at least one of said sectors in each pair;

sensing means coupled to each pair of said sectors for supplying corresponding said electric coil means thereof with an electric signal representative of the shift of the rotor with respect to the stator parallel to the corresponding radial axis;

an intermediary crown provided on the rotor radially opposite to said sectors through an annular gap therebetween, comprising an axially magnetized crown axially clamped between two lower and upper ferromagnetic annular flanges;

a continuous U-shaped cross-section ferromagnetic crown provided on the stator facing the sectors, on the other side radially of said intermediary crown with an annular gap therebetween, said continuous crown comprising lower and upper polar rings made integrally with a cylindric bottom; whereby the pairs of sectors and continuous crown are disposed so as to close up, on either part of the intermediary crown through corresponding gaps, induction lines emitted by the magnetized crown.

2. A magnetic suspension device according to claim 1, wherein each carries said electric coil means.

3. A magnetic suspension device according to claim 1, wherein polar parts of said sectors mutually cover equal angular areas which are higher than those covered by bottom portions corresponding to said sectors.

4. A magnetic suspension device according to claim 1, wherein the polar parts of said pairs of sectors are circumferentially spaced from each other.

5. A magnetic suspension device according to claim 1, wherein the continuous ferromagnetic crown carries pairs of electric coils in a number equal to that of the sector pairs, coupled to said electric coil means of said sectors, disposed along the same radial axes.

6. A magnetic suspension system according to claim 1 or claim 5, wherein said electric coil means are supplied depending on signals from speed sensors responsive to radial displacement speed of the rotor with respect to the stator along the associated radial axes.

7. A magnetic suspension system according to claim 1 or claim 5, wherein said electric coil means are supplied depending on signals from position sensors responsive to the position of the rotor with respect to the stator along the directions considered.

8. A magnetic suspension system according to claim 1 wherein the continuous ferromagnetic crown is radially provided inside the magnetized crown whereas the sectors are radially disposed outside.

9. A device for suspending magnetically a rotor with respect to a stator, said rotor being mechanically free with respect to the stator and being rotatably driven with respect thereto about a rotational axis by a motor, said device comprising:

two pairs of identical ferromagnetic arcuate sectors on said stator, diametrically opposite with respect to said rotational axis along different radial axes, each of said sectors comprising lower and upper discrete arcuate polar parts integrally made with a cylindric bottom portion;

electric coil means about at least one of said sectors in each pair;

sensing means coupled to each pair of said sectors for supplying electric coil means thereof with an electric signal representative of the shift of the rotor with respect to the stator parallel to corresponding radial axis;

a continuous U-shaped cross-section ferromagnetic crown on said stator radially facing said sectors and comprising lower and upper polar rings made integrally with a cylindric bottom; and an intermediary crown on said rotor disposed between said sectors and said continuous ferromagnetic crown so as to determine variable annular gaps therewith, respectively, whereby induction lines generated by magnetized crown of said intermediary crown are closed up radially on both sides thereof through said pairs of sectors and through said continuous U-shaped cross-section ferromagnetic crown, respectively, and through corresponding variable gaps.

* * * * *